(12) United States Patent
Kuo et al.

(10) Patent No.: US 7,489,439 B2
(45) Date of Patent: Feb. 10, 2009

(54) SEMICONDUCTOR RAMAN RING AMPLIFIER

(75) Inventors: Ying-hao Kuo, Campbell, CA (US);
Haisheng Rong, Fremont, CA (US);
Mario J. Paniccia, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 7 days.

(21) Appl. No.: 11/520,533

(22) Filed: Sep. 12, 2006

(65) Prior Publication Data

US 2008/0074736 A1    Mar. 27, 2008

(51) Int. Cl.
*H01S 4/00* (2006.01)
*H01S 5/00* (2006.01)

(52) U.S. Cl. .................... 359/334; 359/344; 372/6; 372/94

(58) Field of Classification Search ................. 359/334, 359/344; 372/6, 94
See application file for complete search history.

(56) References Cited

U.S. PATENT DOCUMENTS

| 7,046,714 | B2 | 5/2006 | Nicolaescu et al. | |
|---|---|---|---|---|
| 7,256,929 | B1 | 8/2007 | Rong et al. | |
| 7,266,258 | B2 * | 9/2007 | Liu et al. | 385/8 |
| 2003/0048527 | A1 * | 3/2003 | Kimerling et al. | 359/344 |
| 2003/0210457 | A1 * | 11/2003 | Emori et al. | 359/334 |
| 2005/0053111 | A1 * | 3/2005 | Nicolaescu et al. | 372/94 |
| 2005/0265679 | A1 | 12/2005 | Liu et al. | |
| 2006/0126986 | A1 | 6/2006 | Liu et al. | |

OTHER PUBLICATIONS

Jalali et al., "Prospects for Silicon Mi-IR Raman Lasers", IEEE Journal of selected topics in quantum electronics, vol. 12, No. 6, Nov./Dec. 2006, pp. 1618-1626.*
U.S. Appl. No. 11/336,286, filed Jan. 20, 2006, Rong et al.
Rong, H., et al., "A Continuous-Wave Raman Silicon Laser," Intel Corporation, Letters to Nature, *Nature*, vol. 433, Feb. 17, 2005, pp. 725-728, www.nature.com/nature.
Jones, R., et al., "Net Continuous Wave Optical Gain in a Low Loss Silicon-On-Insulator Waveguide by Stimulated Raman Scattering," Intel Corporation, *Optics Express*, vol. 13, No. 2, Jan. 24, 2005, pp. 519-525.

(Continued)

*Primary Examiner*—Jack W. Keith
*Assistant Examiner*—Eric Bolda
(74) *Attorney, Agent, or Firm*—Blakely, Sokoloff, Taylor & Zafman LLP (57) ABSTRACT

A semiconductor-based Raman ring amplifier is disclosed. A method according to aspects of the present invention includes directing a pump optical beam having a pump wavelength and an input pump power level from an optical waveguide into a ring resonator. The optical waveguide and ring resonator are comprised in semiconductor material. A signal optical beam having a signal encoded thereon at a signal wavelength is directed from the optical waveguide into the ring resonator. The pump optical beam is resonated within the ring resonator to increase a power level of the pump optical beam to a power level sufficient to amplify the signal optical beam via stimulated Raman scattering (SRS) within the ring resonator. A free carrier concentration in the optical waveguide and the ring resonator is reduced to reduce attenuation of the pump optical beam and the signal beam.

13 Claims, 5 Drawing Sheets

OTHER PUBLICATIONS

Liu, A., et al., "Optical Amplification and Lasing by Stimulated Raman Scattering in Silicon Waveguides," *Journal of Lightwave Technology*, vol. 24, No. 3, Mar. 2006, pp. 1440-1445.

Rong, H., et al., "High Efficiency Wavelength Conversion of 10 Gb/s Data in Silicon Waveguides," Intel Corporation, Optics Express, vol. 14, No. 3, Feb. 6, 2006, pp. 1182-1188.

* cited by examiner

SEMICONDUCTOR RAMAN RING AMPLIFIER

BACKGROUND OF THE INVENTION

1. Field of the Invention

Embodiments of invention relate generally to optical devices and, more specifically but not exclusively relate to amplifying optical power in an optical beam.

2. Background Information

The need for fast and efficient optical-based technologies is increasing as Internet data traffic growth rate is overtaking voice traffic pushing the need for fiber optical communications. Transmission of multiple optical channels over the same fiber in the dense wavelength-division multiplexing (DWDM) system provides a simple way to use the unprecedented capacity (signal bandwidth) offered by fiber optics. Commonly used optical components in the system include wavelength division multiplexed (WDM) transmitters and receivers, optical filter such as diffraction gratings, thin-film filters, fiber Bragg gratings, arrayed-waveguide gratings, optical add/drop multiplexers, optical amplifiers and optical attenuators. An optical amplifier is a device that can be used to increase the optical intensity or power of an optical beam. An optical amplifier can be useful to for example increase the intensity of an optical beam to compensate for power loss before or after being transmitted from a source to a destination.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Methods and apparatuses for amplifying optical beams are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. In addition, it is appreciated that the figures provided herewith are for explanation purposes to persons ordinarily skilled in the art and that the drawings are not necessarily drawn to scale.

Figure 1:
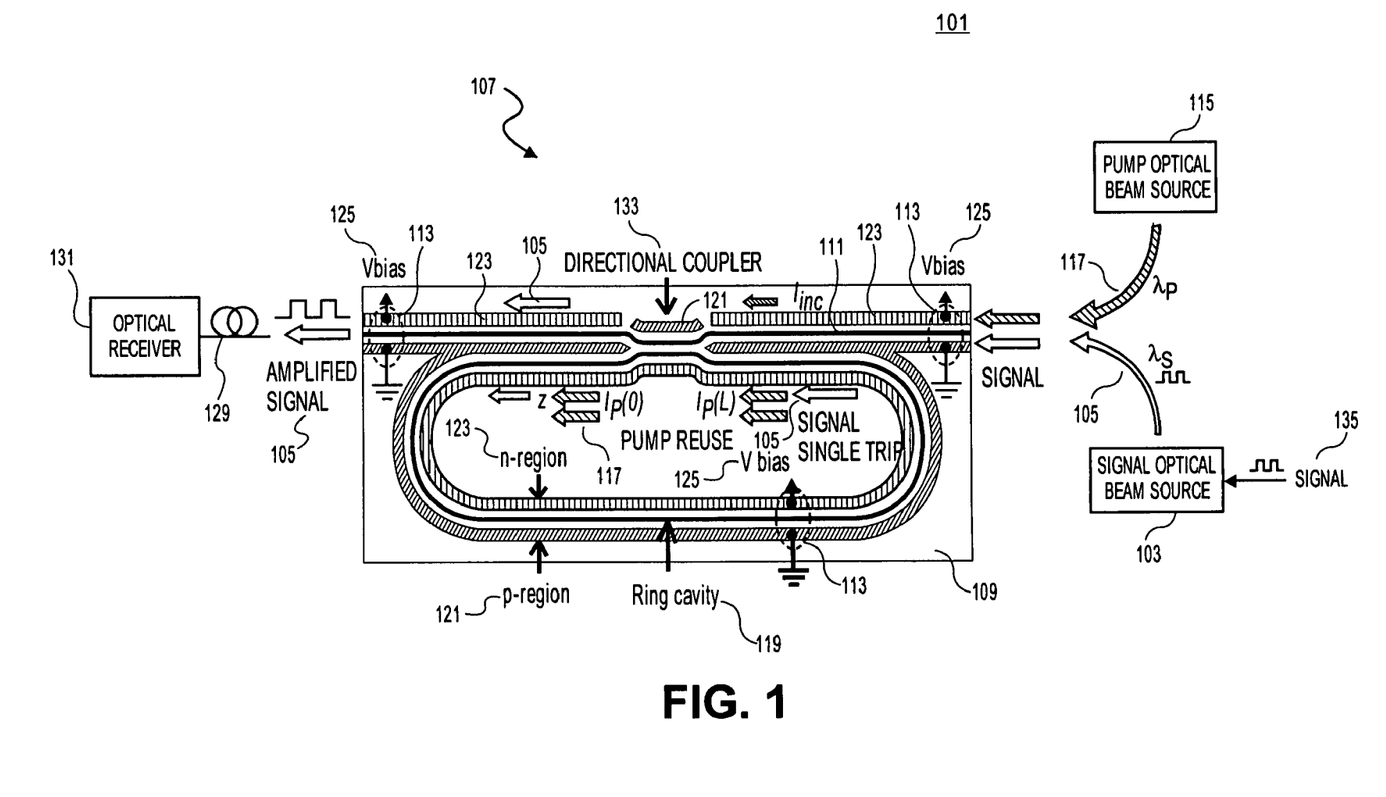
FIG. 1 is a block diagram illustrating generally an example optical system including an example of a semiconductor-based Raman optical ring amplifier in accordance with the teachings of the present invention.

FIG. 1 illustrates generally a system including a signal optical beam source coupled to transmit a signal optical beam to an optical receiver through an example of an optical amplifier 107 in accordance with the teachings of the present invention. In particular, FIG. 1 shows system 101 including signal optical beam source 103 directing a signal optical beam 105 to an optical amplifier 107. In the illustrated example, optical amplifier 107 is a semiconductor-based Raman ring amplifier in accordance with the teachings of the present invention. In one example, signal optical abeam source 103 is coupled to receive a signal 135 and the signal 135 is encoded at a signal wavelength $\lambda_S$ in signal optical beam 105. In the example, the signal wavelength of $\lambda_S$ includes infrared (IR) or near infrared (NIR) light such as for example light having wavelengths of 1310 nm or 1550 nm or the like.

As will be discussed, signal optical beam 105 is amplified such that the resultant amplified signal optical beam 105 is transmitted from optical amplifier 107 to an optical receiver 131. In one example, the amplified signal optical beam 105 is transmitted through a standard optical fiber 129 from optical amplifier 107 to optical receiver 131. For efficient operation, one of a variety of mode couplers such as for example tapers or the like in the semiconductor material 109 of optical amplifier 107 may be employed to optically couple optical amplifier 107 to optical fiber 129.

As shown in FIG. 1, optical amplifier 107 includes an optical waveguide 111 coupled to a ring cavity or ring resonator 119 through a directional coupler 133, all of which are integrated or included in the semiconductor material 109 that is optically coupled to receive optical beam 105. In one example, optical waveguide 111, ring resonator 119 and directional coupler 133 all include optical rib waveguides etched in the semiconductor material 109, and are all are integrated with a diode structure 113 as shown to control free carrier concentrations in optical amplifier 107 in accordance with the teachings of the present invention. In one example, the diode structure 113 is a reverse biased PIN diode structure. As will be discussed, the free carrier concentrations in optical waveguide 111, ring resonator 119 and directional coupler 133 are controlled for reduced attenuation or propagation loss to allow for efficient simulated Raman Scattering (SRS). In particular, the diode structure 113 is used in one example to control the removal of free carriers in accordance with the teachings of the present invention.

In operation, the example illustrated in FIG. 1 shows that optical waveguide 111 is optically coupled to receive a pump optical beam 117 having an input pump power level from a pump optical beam source 115 and signal optical beam 105 from signal optical beam source 103. In one example, the wavelengths used depend at least in part on the properties of the materials used in optical amplifier 107. For instance, in an example in which silicon is used for semiconductor material 109, pump optical beam 117 has a pump wavelength $\lambda_P$ that is a Stokes shift less than the signal wavelength $\lambda_S$ of signal optical beam 105.

As illustrated in the example shown in FIG. 1 propagating from right to left, the signal optical beam 105 and pump optical beam 117 are both directed from optical waveguide 111 into ring resonator 119 through directional coupler 133. Since the Stokes shift in silicon is 15.6 THz, it is possible for directional coupler 133 to have different respective couplings for the pump wavelength $\lambda_P$ and signal wavelength $\lambda_S$ in accordance with the teachings of the present invention. In the illustrated example, directional coupler 133 is a wavelength-dependent coupler that results in ring resonator 119 having high Q, or low bandwidth, for pump optical beam 117 but low Q, or high bandwidth, for signal optical beam 105 in accordance with the teachings of the present invention. As a result, the pump optical beam 117 can be recirculated, reused or recycled within ring resonator 119. In this way, the input power level of pump optical beam 117 is enhanced or magnified in ring resonator 119 to a much greater power than the input power level due to the cavity resonance effect. With the increased power level of pump optical beam 117 at the pump wavelength $\lambda_P$, a fast signal 135 encoded in signal optical beam 105 is amplified at the signal wavelength $\lambda_S$ inside ring resonator 119 with pump optical beam 117 via SRS, without sacrificing signal amplification bandwidth and/or speed in accordance with the teachings of the present invention.

Figure 2:
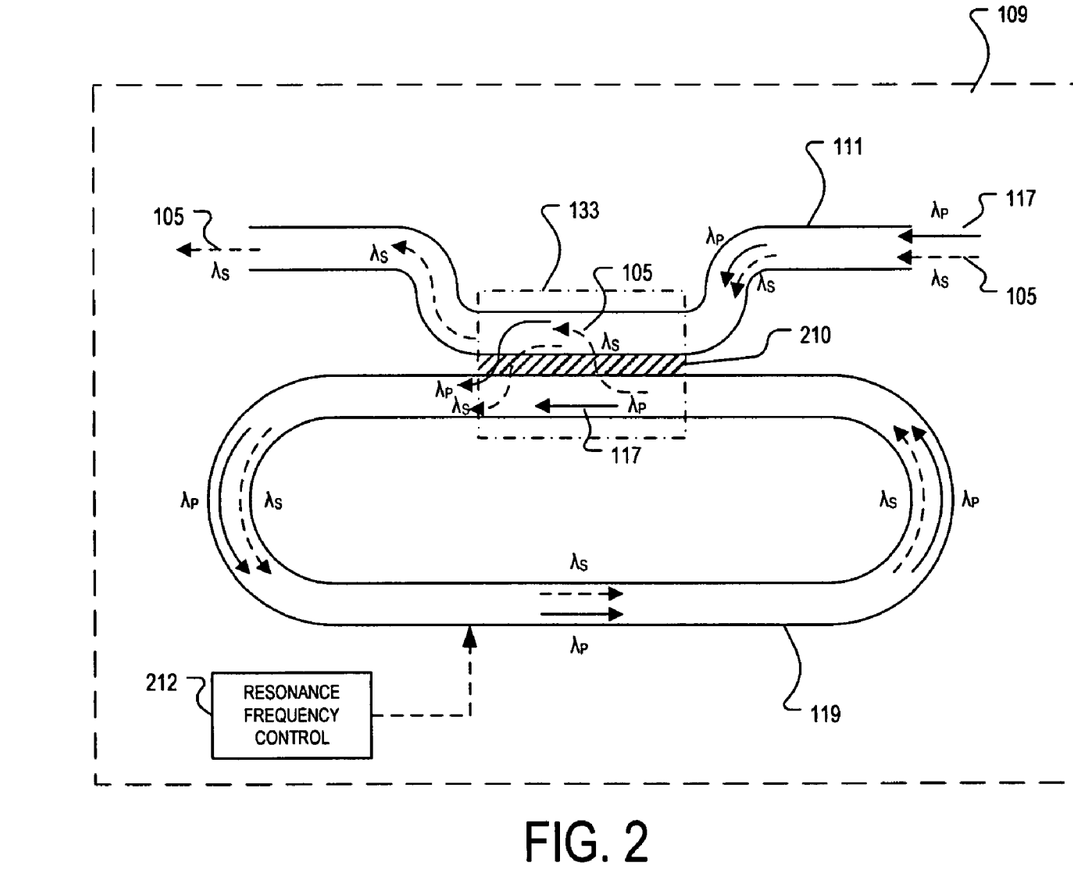
FIG. 2 is a block diagram illustrating generally an example directional coupler included in an example of a semiconductor-based Raman optical ring amplifier in accordance with the teachings of the present invention.

To illustrate, FIG. 2 is a block diagram illustrating generally increased detail of example directional coupler 133 included in an example of a semiconductor-based Raman optical ring amplifier in accordance with the teachings of the present invention. As shown in the illustration, pump optical beam 117 having the wavelength $\lambda_P$ and signal optical beam 105 having the wavelength $\lambda_S$ are directed along optical waveguide 111 to directional coupler 133. In one example, directional coupler 133 includes a thin insulating region 210 between optical waveguide 111 and ring resonator 119 to provide an evanescent coupling through the semiconductor material 109 between optical waveguide 111 and ring resonator 119. As a result, pump optical beam 117 and signal optical beam 105 are directed from optical waveguide 111 into ring resonator 119 through the evanescent coupling in directional coupler 133.

In one example, the signal wavelength $\lambda_S$ of signal optical beam 105 has close to 100% coupling in directional coupler 133. As a result, the signal optical beam 105 propagates around ring resonator 119 and a majority or substantially all of signal optical beam 105 is directed back out of ring resonator 119 to optical waveguide 111 after one round trip in ring resonator 119. In contrast, the pump wavelength $\lambda_P$ of pump optical beam 117 is such that directional coupler 133 directs a majority or substantially all of pump optical beam 117 to remain or be recirculated within ring resonator 119 after each round trip, which results in the power level of pump optical beam 117 being enhanced by the cavity resonance effect within ring resonator 119. Signal optical beam 105 is amplified within ring resonator 119 through SRS generated by the enhanced pump power of pump optical beam 117. Since signal optical beam 105 has the close to 100% coupling in directional coupler 133, signal optical beam 105 experiences practically no resonance effect and therefore amplification bandwidth is preserved in accordance with the teachings of the present invention.

In one example, since the majority of or substantially all of pump optical beam 117 is recirculated or reused within ring resonator 119 with directional coupler 133, ring resonator 119 and/or directional coupler 133 also function as an on-chip filter to suppress the pump wavelength $\lambda_P$. In one example, when substantially all of pump optical beam 117 is critically coupled into the ring resonator 119, substantially all of the energy of pump optical beam 117 is consumed inside ring resonator 119.

As shown in the example of FIG. 2, a resonance frequency controller 212 may also be included and is coupled to the ring resonator 119 in accordance with the teachings of the present invention. In various examples, the resonance frequency controller may include for example a temperature controller having for example an external thermoelectric cooler (TEC) or an on-chip heater electrode, current injection device or other suitable device to tune the resonance frequency of the ring resonator 119 in accordance with the teachings of the present invention. In other examples, such as for example multiple wavelength systems, the temperature controller could be used to adjust or tune the resonance frequency of the ring resonator to provide a tunable filter function to optical amplifier 107.

Figure 3:
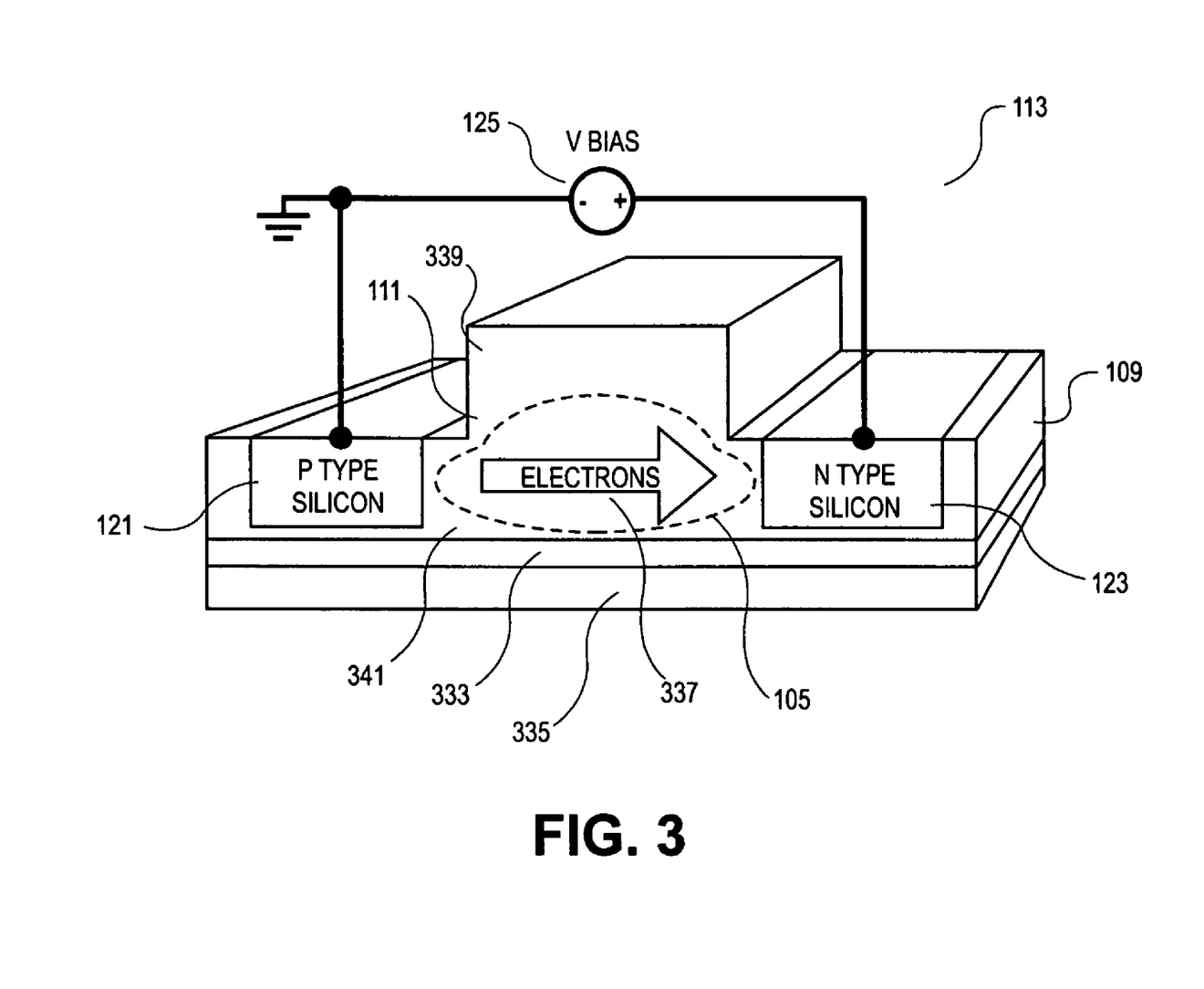
FIG. 3 is a cross section view illustrating generally an example semiconductor-based optical waveguide including an example of a diode structure to control the free carrier concentration in the semiconductor waveguide in an example semiconductor-based Raman optical ring amplifier in accordance with the teachings of the present invention.

FIG. 3 is a cross section view illustrating generally an example a diode structure 113, which is integrated into optical waveguide 111, to control the free carrier concentration in the semiconductor optical waveguide 111 in an example semiconductor-based Raman optical ring amplifier in accordance with the teachings of the present invention. It is noted that the example illustrated in FIG. 3 shows signal optical beam 105 directed through the cross-section of optical waveguide 111. However, in another similar diagram, it is appreciated that pump optical beam 117 could be illustrated being directed through a cross-section illustration of ring resonator 119 in accordance with the teachings of the present invention.

As shown in the depicted example, optical waveguide 111 is a rib waveguide including a rib region 339 and a slab region 341. In the illustration, signal optical beam 105 is shown propagating through the rib optical waveguide 111. As shown, the intensity distribution of the optical mode of optical beam 105 is such that the majority of the optical beam 105 propagates through a portion of the rib region 339 or a portion of the slab region 341 of optical waveguide 111 towards the interior of the rib optical waveguide 111. As also shown with the optical mode of optical beam 105, the intensity of the propagating optical mode of optical beam 105 is vanishingly small at the "upper corners" of rib region 339 as well as the "sides" of the slab region of optical waveguide 111.

In the illustrated example, optical waveguide 111 is formed or etched in a silicon-on-insulator (SOI) wafer including the silicon of semiconductor material 109, a silicon substrate layer 335 and a buried oxide layer 333 disposed between the silicon of semiconductor material 109 and silicon substrate layer 335.

In the example shown in FIG. 3, the P region 121 and N region 123 of the diode structure 113 disposed in optical waveguide 111 are defined at opposite lateral sides of the slab region 341 in the optical waveguide 111, outside of the optical mode of optical beam 105. As shown in the example, diode structure 113 is a PIN diode structure, which includes P doped silicon in P region 121, intrinsic silicon in semiconductor material 109 and N doped silicon in N region 123. In the illustrated example, the optical mode of optical beam 105 propagates through the intrinsic silicon in semiconductor material 109 of the PIN diode structure 113.

The example shown in FIG. 3 shows voltage source 125 providing a bias voltage V-bias coupled between P region 121 and N region 123. P region 121 is also grounded and voltage source 125 is coupled to apply the V-bias voltage between P region 121 and N region 123 to bias the diode structure 113 in accordance with the teachings of the present invention. For example, when reverse biasing the diode structure 113 as shown, an electric field is created between the P region 121 and N region 123 to sweep free carriers 337, which may include electrons and/or holes, from the optical waveguide 111. By sweeping out the free carriers 337, as discussed, the free carrier concentrations, lifetimes or the removal of the free carriers 337 can be controlled in accordance with the teachings of the present invention. This enables control or reduction of attenuation of the power level of an optical beam propagating through the optical waveguide 111 in accordance with the teachings of the present invention.

In one example, realization of the wavelength-dependent directional coupler 133 in accordance with the teachings of the present invention is based on the dispersion and polarization dependence of the coupling coefficient. The Stokes wavelength has a larger mode profile, which increases the mode overlapping between coupled waveguides, and the TE field has stronger coupling compared to the TM field. The coupling ratio depends on the geometry of the rib, the coupler length and the spacing between the two waveguides of directional coupler 133.

Referring briefly back to the example shown in FIG. 1, the evolution of the pump intensity $I_P$ along the propagation direction z in the ring resonator can be described by $$\frac{d}{dz}I_P(z) = \left[-\alpha_P - \beta \cdot I_P(z) - \frac{\sigma_P \cdot \beta \cdot \tau_{\textit{eff}}}{2 \cdot E_P}I_P^2(z)\right] \cdot I_P(z), \quad (1)$$

where $\alpha_P$ is the linear loss due to scattering and material absorption, which in one example waveguide is usually around 0.3 dB/cm, $\beta=0.5$ cm/GW is the TPA coefficient, $\tau_{\textit{eff}}$ is the effective carrier lifetime and $\alpha_p=1.45\times10^{-17}$ cm² is the FCA cross section at the pump wavelength $\lambda_P$, and $E_P$ is the photon energy. As shown in the example of FIG. 1, the integration of a reversed-biased diode structure 113 along optical waveguide and ring resonator 119 of optical amplifier 107 can reduce the effective carrier lifetime $\tau_{\textit{eff}}$ to approximately 1 ns in accordance with the teachings of the present invention.

In one example, the round trip gain in ring resonator 119 of signal optical beam 105 at the signal wavelength $\lambda_S$, which is a Stokes shift from $\lambda_P$, or is at Stokes wavelength, can be calculated by integrating the net gain, which is Raman gain minus loss, along the propagation path, $$G_s = \oint_{L_{ring}} dz\left[g_r \cdot I_P(z) - \alpha_s - 2\beta \cdot I_P(z) - \frac{\sigma_s \cdot \beta \cdot \tau_{\textit{eff}}}{2 \cdot E_P}I_P^2(z)\right], \quad (2)$$

where $g_r=9.5$ cm/GW is the Raman gain coefficient, $\alpha_S=0.3$ dB/cm is the linear loss and $\sigma_S=1.71\times10^{-17}$ cm² is the FCA cross section at Stokes wavelength. Using a finite element method, the evolution of the pump intensity and net gain inside ring resonator 119 can be numerically derived. At resonance, the relationship between the incident power $I_{inc}$ and the power inside the cavity $I_p$ can be described by $$I_{inc} = I_P(0) \cdot \frac{(1-\sqrt{A \cdot (1-K)})^2}{K}, \quad A = \frac{I_P(L)}{I_P(0)}, \quad (3)$$

where K is the power coupling ratio of the coupler and A is the round-trip loss coefficient. In one example, the strongest cavity enhancement occurs at critical coupling, where A+K=1.

Figure 4:
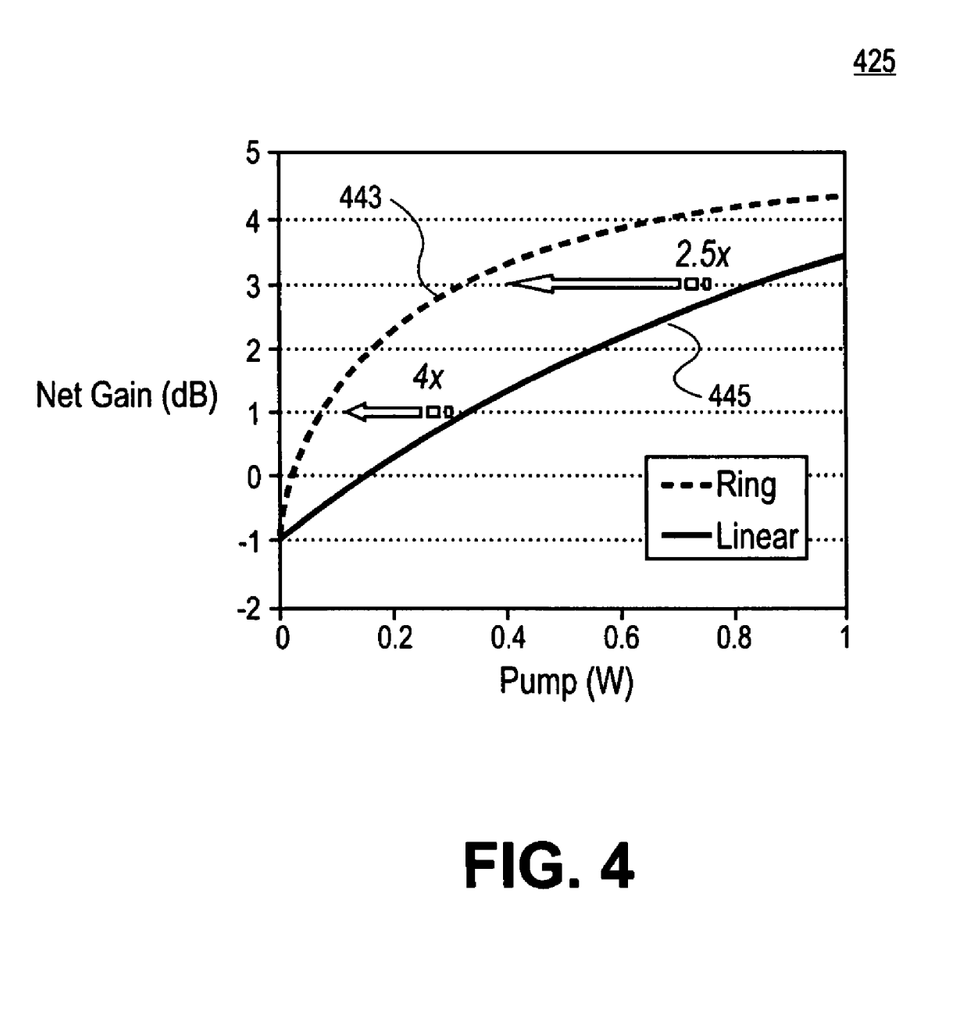
FIG. 4 is diagram illustrating generally a comparison in performance of an example semiconductor-based Raman optical ring amplifiers with a linear amplifier in accordance with the teachings of the present invention.

FIG. 4 is diagram illustrating generally a comparison in performance of an example semiconductor-based Raman optical ring amplifier with a straight or linear waveguide amplifier in accordance with the teachings of the present invention. In particular, based on Equations 1-3 above, the Raman amplification vs. pump power for an example ring resonator 119 that is 3 cm long and for a straight linear waveguide of the same length for comparison is illustrated. In the example, the performance for ring resonator 119 is illustrated with plot 443 while the performance for a straight linear waveguide is illustrated with plot 445. In the example, 19% coupling is chosen at the pump wavelength $\lambda_P$ to meet the critical coupling condition at the low input power level, 100% coupling at the signal wavelength $\lambda_S$ is assumed so that the application bandwidth is not limited by the ring resonator 119. As shown, 3 dB gain is achieved with a 3 cm ring resonator 119 with 0.3 dB/cm loss and a pump power of 335 mW, which is 2.5 times lower compared to a linear straight waveguide of the same length, which used a pump power of 850 mW. To achieve 1 dB gain, only 85 mW is required for the ring compared to 350 mW for the straight linear waveguide, which is 4 times lower.

Figure 5:
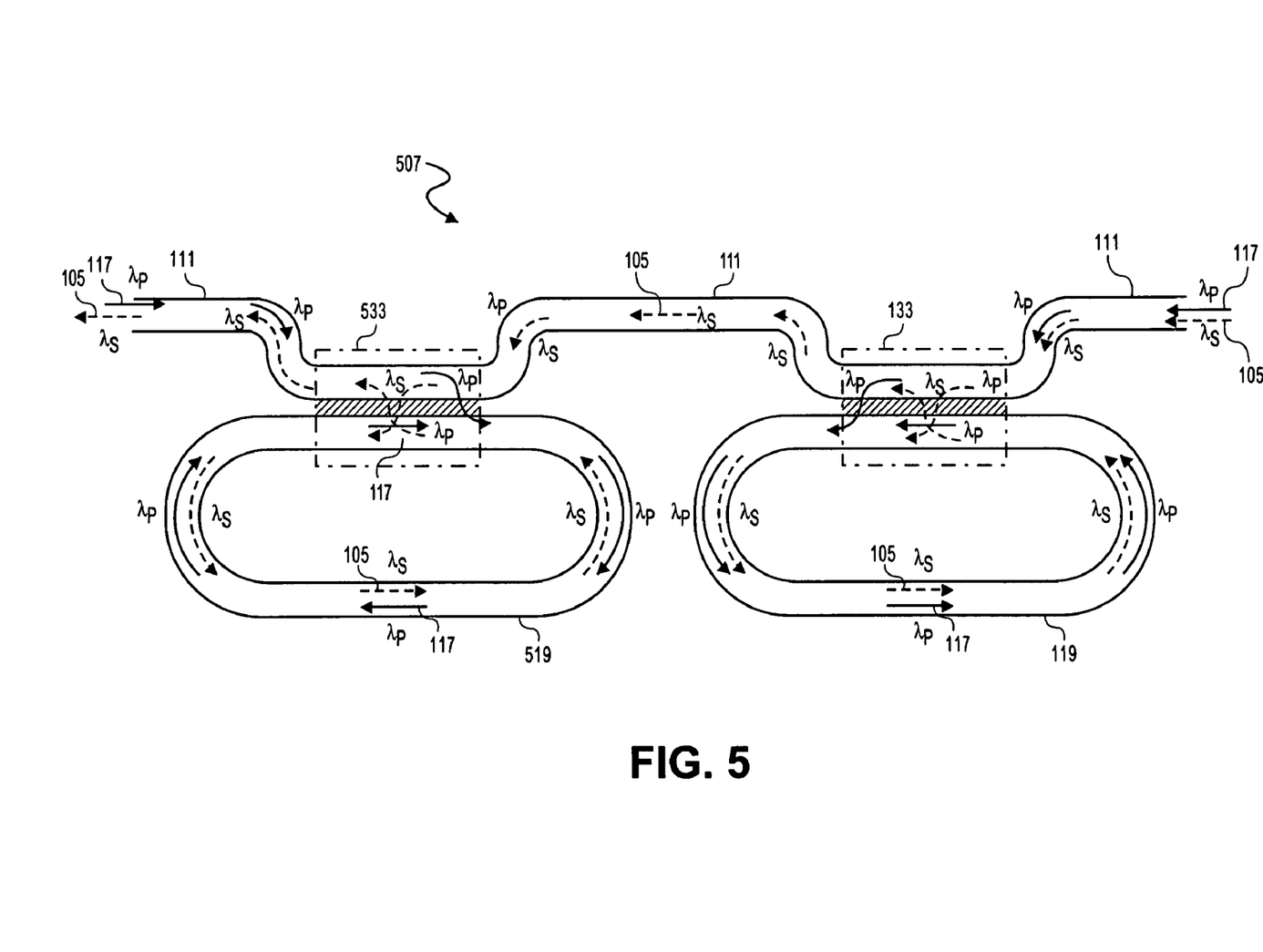
FIG. 5 is a block diagram illustrating generally an example of a semiconductor-based Raman optical ring amplifier with cascaded Raman ring amplifiers in accordance with the teachings of the present invention.

It is appreciated that the relatively short device length and small footprint of an optical amplifier in accordance with the teachings of the present invention allow a greater number of devices to be produced on a single wafer. Since the design is compact, multi-stage amplification is possible on a single chip in accordance with the teachings of the present invention. To illustrate, FIG. 5 is a block diagram illustrating generally an example of a semiconductor-based Raman optical ring amplifier 507 with cascaded Raman ring amplifiers in accordance with the teachings of the present invention. It is appreciated that optical amplifier 507 of FIG. 5 shares similarities with optical amplifier 107 of FIG. 1. For instance, optical amplifier 507 includes an optical waveguide 111 coupled to ring resonator 119 through a directional coupler 133. However, optical amplifier also includes an additional cascaded ring resonator 519 coupled to optical waveguide 111 through an additional directional coupler 533 in accordance with the teachings of the present invention.

In operation, pump optical beam 117 is directed into optical waveguide 111 at both ends as shown such that pump optical beam 117 is directed into both ring resonator 119 and ring resonator 519 through directional coupler 133 and directional coupler 533, as illustrated. In the example, the coupling provided by directional couplers 133 and 533 is such that substantially all of pump optical beam 117 is recirculated or recycled within ring resonators 119 and 519 resulting in enhanced pump optical beams due to the cavity resonance effect as discussed above.

Continuing with the example, signal optical beam 105 propagates along optical waveguide 111 from right to left as shown in the FIG. 5 example, and is directed into ring resonator 119 through directional coupler 133. Signal optical beam 117 is amplified within ring resonator 119 due to SRS and then is directed back out from ring resonator 119 after one round trip into optical waveguide 111 through directional coupler 133. The amplified signal optical beam 105 is then directed from directional coupler 133 along optical waveguide 111 to directional coupler 533, where it is directed into ring resonator 519. The amplified signal optical beam is then further amplified within ring resonator 519 due to SRS and this is directed back out from ring resonator 519 after one round trip into optical waveguide 111 through directional coupler 533.

Therefore, with the cascaded ring resonators 119 and 519, the signal optical beam 105 may be amplified with multiple stages in accordance with the teachings of the present invention. In one example using the two stage device as shown in FIG. 5, 3 dB amplification can be reached with a total pump power of 220 mW and the device size fits well with a 16 mm×2 mm footprint in accordance with the teachings of the present invention.

The above description of illustrated embodiments of the invention, including what is described in the abstract, is not intended to be exhaustive or to be limitation to the precise forms disclosed. While specific embodiments of, and examples for, the invention are described herein for illustrative purposes, various equivalent modifications are possible, as those skilled in the relevant art will recognize. Indeed, it is appreciated that the specific wavelengths, dimensions, materials, times, voltages, power range values, etc., are provided for explanation purposes and that other values may also be employed in other embodiments in accordance with the teachings of the present invention.

These modifications can be made to embodiments of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation.

What is claimed is:

1. An apparatus, comprising:
   an optical waveguide included in semiconductor material, wherein the optical waveguide is operatively coupled to receive a pump optical beam having an input pump power and a pump wavelength and a signal optical beam having a signal encoded thereon at a signal wavelength;
   a ring resonator included in the semiconductor material;
   a directional coupler included in the semiconductor material optically coupling the optical waveguide and the ring resonator; wherein pump optical beam is resonated within the ring resonator to increase a power level of the pump optical beam to a power level sufficient to amplify the signal optical beam via stimulated Raman scattering (SRS) within the ring resonator; and
   a diode structure included in the semiconductor material biased to control a free charge carrier concentration in the optical waveguide and the ring resonator.

2. The apparatus of claim 1 wherein the directional coupler is wavelength-dependent such that a majority of the pump optical beam recirculate within the ring resonator and a majority of the signal optical beam is output from the ring resonator through the directional coupler after one round trip.

3. The apparatus of claim 1 further comprising a resonance frequency controller coupled to the semiconductor material to tune a resonance frequency of the ring resonator.

4. The apparatus of claim 3 wherein the resonance frequency controller comprises a temperature controller thermally coupled to the semiconductor material to tune the resonance frequency of the ring resonator.

5. The apparatus of claim 1 further comprising:
   a second ring resonator comprised in the semiconductor material; and
   a second directional coupler included in the semiconductor material optically coupling the optical waveguide and the second ring resonator such that the pump optical beam and an amplified signal optical beam output from the first ring resonator are directed into the second ring resonator, wherein pump optical beam is resonated within the second ring resonator to increase the power level of the pump optical beam to the power level sufficient to further amplify the amplified signal optical beam via SRS within the second ring resonator.

6. The apparatus of claim 1 wherein the semiconductor material comprises silicon.

7. The apparatus of claim 1 wherein the diode structure comprises PIN diode comprised in the semiconductor material reverse biased to sweep free carriers from the optical waveguide and the ring resonator.

8. A system, comprising:
   a signal optical beam source to generate a signal optical beam having a signal encoded thereon at a signal wavelength;
   a pump optical beam source to generate a pump optical beam having an input pump power and a pump wavelength;
   an optical waveguide included in semiconductor material, wherein the optical waveguide is operatively coupled to receive the pump optical beam and the signal optical beam;
   a ring resonator included in the semiconductor material;
   a directional coupler included in the semiconductor material optically coupling the optical waveguide and the ring resonator, wherein pump optical beam is resonated within the ring resonator to increase a power level of the pump optical beam to a power level sufficient to amplify the signal optical beam via stimulated Raman scattering (SRS) within the ring resonator
   a diode structure included in the semiconductor material biased to control a free charge carrier concentration in the optical waveguide and the ring resonator;
   an optical fiber optically coupled to the ring resonator through the directional coupler; and
   an optical receiver optically coupled to receive the amplified signal optical beam through the optical fiber.

9. The system of claim 8 wherein the directional coupler is wavelength-dependent such that a majority of the pump optical beam recirculate within the ring resonator and a majority of the signal optical beam is output from the ring resonator through the directional coupler after one round trip.

10. The apparatus of claim 8 further comprising a resonance frequency controller coupled to the semiconductor material to tune a resonance frequency of the ring resonator.

11. The apparatus of claim 10 wherein the resonance frequency controller comprises a temperature controller thermally coupled to the semiconductor material to tune the resonance frequency of the ring resonator.

12. The apparatus of claim 8 further comprising:
   a second ring resonator comprised in the semiconductor material; and
   a second directional comprising included in the semiconductor material optically coupling the optical waveguide and the second ring resonator such that the pump optical beam and an amplified signal optical beam output from the first ring resonator are directed in to the second ring resonator, wherein pump optical beam is resonated within the second ring resonator to increase the power level of the pump optical beam to the power level sufficient to further amplify the amplified signal optical beam via SRS within the second ring resonator.

13. The apparatus of claim 8 wherein the semiconductor material comprises silicon.

* * * * *

UNITED STATES PATENT AND TRADEMARK OFFICE
CERTIFICATE OF CORRECTION

PATENT NO. : 7,489,439 B2 Page 1 of 1
APPLICATION NO. : 11/520533
DATED : February 10, 2009
INVENTOR(S) : Kuo et al.

It is certified that error appears in the above-identified patent and that said Letters Patent is hereby corrected as shown below:

In column 7, at line 46 delete, "recirculate" and insert --recirculates--.

Signed and Sealed this

Sixth Day of April, 2010

David J. Kappos
*Director of the United States Patent and Trademark Office*